United States Patent [19]
Parry et al.

[11] Patent Number: 5,822,381
[45] Date of Patent: Oct. 13, 1998

[54] DISTRIBUTED GLOBAL CLOCK SYSTEM

[75] Inventors: David M. Parry, San Jose; Charles E. Narad, Santa Clara; Daniel E. Lenoski, San Jose, all of Calif.

[73] Assignee: Silicon Graphics, Inc., Mountain View, Calif.

[21] Appl. No.: 435,455

[22] Filed: May 5, 1995

[51] Int. Cl.$^6$ ..................................................... H04L 7/02
[52] U.S. Cl. ........................... 325/356; 375/371; 375/386
[58] Field of Search ...................................... 375/354, 356, 375/371, 357, 358; 370/85.1, 100.1, 103, 104, 503–489, 516, 519; 328/103, 105, 153; 327/141; 371/1

[56] References Cited

U.S. PATENT DOCUMENTS

| | | | |
|---|---|---|---|
| 5,361,277 | 11/1994 | Grover ...................................... | 375/356 |
| 5,361,398 | 11/1994 | Christian et al. .................... | 375/356 X |
| 5,406,559 | 4/1995 | Edem et al. ............................... | 370/91 |
| 5,416,808 | 5/1995 | Witsaman et al. ...................... | 375/356 |
| 5,432,823 | 7/1995 | Gasbarro et al. ........................ | 375/356 |

OTHER PUBLICATIONS

Ofek, Yoram, "Generating a Fault Tolerant Global Clock in a High Speed Distributed System", Distributed Computing Systems, 1989 International Conference.

*Primary Examiner*—Tesfaldet Bocure
*Assistant Examiner*—Bryan Webster
*Attorney, Agent, or Firm*—Sterne, Kessler, Goldstein & Fox, P.L.L.C.

[57] ABSTRACT

A clock system for a distributed multiprocessor system includes a plurality of local clock circuits and a distribution network. The distribution network includes a plurality of interconnected routers. Each local clock circuit is associated with a processing node of the multiprocessor system. Each local clock circuit generates a global clock source signal, provides the global clock source signal to the distribution network, receives a global clock signal back from the distribution network, and generates a global time value based on a local clock signal and the global clock signal. The router is part of the distribution network of the multiprocessor system. The router receives the global clock source signals from each of the local clock circuits, selects one of the global clock source signals as the global clock signal and provides the global clock signal to the distribution network for distribution to each of the local clock circuits.

17 Claims, 7 Drawing Sheets

DISTRIBUTED GLOBAL CLOCK SYSTEM

BACKGROUND OF THE INVENTION

1. Field of the Invention

The invention relates generally to distributed shared memory multiprocessor systems and, more particularly, to a distributed global clock system for such a distributed shared memory multiprocessor system.

2. Related Art

In a highly distributed multiprocessor system, a plurality of processors are operating asynchronously. This means that each processor is operating in accordance with a local clock or oscillator. The clocks are not synchronized between processors. However, in order to run real-time applications, a common time base is needed across all processors.

Two conventional approaches have been used to provide a common time base across multiple processors of a distributed multiprocessor system. A first solution is to provide a global clock with a dedicated line going to each processor. This solution suffers from the shortcoming that the clock represents a single point of failure for the entire processing system. It is desirable to eliminate any single points of failure to minimize system downtime and assure high availability.

Another conventional solution is to provide a global counter that may be read by any processor in the system. In addition to providing a single point of failure, reading a remote counter is a high-latency operation. Inaccuracy may result because the latency or delay is unpredictable so that two processors initiating a read simultaneously could receive substantially different results as well as receiving these results at substantially different times. This will introduce jitter into the timing of the multiprocessor system. In accounting for such jitter, the throughput of the multiprocessor system is reduced.

One solution which will eliminate the single-point failure and eliminate jitter is to have an independent clock at every processor. Known clocks, however, are not accurate enough to operate in this manner. For example, a typical 1 MHz clock may have an accuracy of 50 parts per million. This means that in one second, a clock would drift 50 clock cycles. Over time, this will accumulate to provide a significant amount of skew. Time must be allocated in each frame for the skew. This reduces system throughput. In addition, the clocks will continue to accumulate error unless a periodic synchronization takes place. However, periodic synchronization would require some global mechanism as discussed above.

Real-time video provides an example of an application requiring a common time base across all processors. In real-time video, a complete video image or frame is generated every frame interval which is typically 1/30th of a second. Each processor may be assigned to generate a portion of each video image. Thus, all processors must complete the assigned task during the frame interval. If independent clocks are used, then differences between the individual clocks will produce skew which must be accounted for in the frame interval, leaving less time available for the processors to complete the assigned tasks. Moreover, clock drift will eventually accumulate until the frame interval for one processor will not match the frame interval of another processor. This will result in unpredictable video images being generated by the out-of-synch processors.

SUMMARY OF THE INVENTION

The invention is a clock system for a distributed multiprocessor system having a plurality of processing nodes interconnected by a distribution network. The clock system is implemented using a plurality of local clock circuits and the distribution network. The distribution network includes a plurality of interconnected routers. Each router has a plurality of input ports, a plurality of output ports, and a mechanism for steering information between these ports. Each router port may be connected to a port of another router or to a processing node.

Each local clock circuit is associated with a processing node of the multiprocessor system. Each local clock circuit generates a global clock source signal, provides the global clock source signal to the distribution network, receives a global clock signal back from the distribution network, and generates a global time value based on a local clock signal and the global clock signal.

Each router receives a global clock source signal on each of its input ports and selects one of these global clock source signals to forward to all of its output ports. The routers are programmed such that this results in the global clock source signal from a single local clock circuit being chosen as the global clock signal which is provided to each of the local clock circuits.

Each local clock circuit includes a global source clock for generating the global clock source signal, an output for providing the global clock source signal to the distribution network, an input for receiving the global clock signal from the distribution network, a filter circuit for producing a counter increment signal based on the local clock signal and the global clock signal, and a counter for generating the global time value in response to the counter increment signal.

The filter circuit generates a periodic sampling window having a frequency approximately equal to a frequency of the global clock signal and having a length corresponding to a portion of a period of the global clock signal. The filter circuit produces the counter increment signal in response to receipt of an edge of the global clock signal during the sampling window. The filter circuit will also produce the counter increment signal at expiration of the sampling window if an edge of the global clock signal is not received during the sampling window. Upon production of the counter increment signal, the filter circuit terminates the sampling window. In addition, a subsequent sampling window is scheduled upon production of the counter increment signal, and the length of the sampling window is adjusted based upon whether the counter increment signal was produced as a result of the global clock signal or as a result of expiration of a previous sampling window.

Each time an edge of a global clock signal is not received during the sampling window, a first error counter is incremented to record the event. Similarly, each time an edge of a global clock signal is received outside of the sampling window, a second error counter is incremented. The first error counter produces a first error signal when the number of missed edges exceeds a first threshold. The second error counter generates a second error signal when the number of extra edges exceeds a second threshold.

Each local clock circuit will count edges of the global clock signal using the counter circuit. The counters of all local clock circuits are initially synchronized by disabling the global clock source signal currently being selected as the global clock signal. This stops all counters in the processor system from counting. Each counter is then initialized to the same value. The global clock source signal selected as the global clock signal is then enabled so that all counters will begin counting the global clock signal in synchrony. The result is a plurality of global clock counters which operate in lockstep.

The resulting global clock system provides a low-latency, globally accurate clock without requiring any centralized resources. Accordingly, the global clock does not present a single point of failure and therefore does not adversely affect the high availability of the processor system. By "high availability system," it is meant a system that is able to continue operation in the presence of failures in one or more system components. The invention provides high availability in the failure of a clock circuit. Failure of the local clock circuit providing the global clock signal will result only in a brief period of unavailability until the system reconfigures itself around the fault by selecting a different clock circuit to provide the global clock signal. Any one of the local clock circuits in the multiprocessor system can be the source of the global clock signal. Thus, the system exhibits redundant resources and sufficient flexibility to select any one resource as the "global clock."

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENT

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

Figure 1:
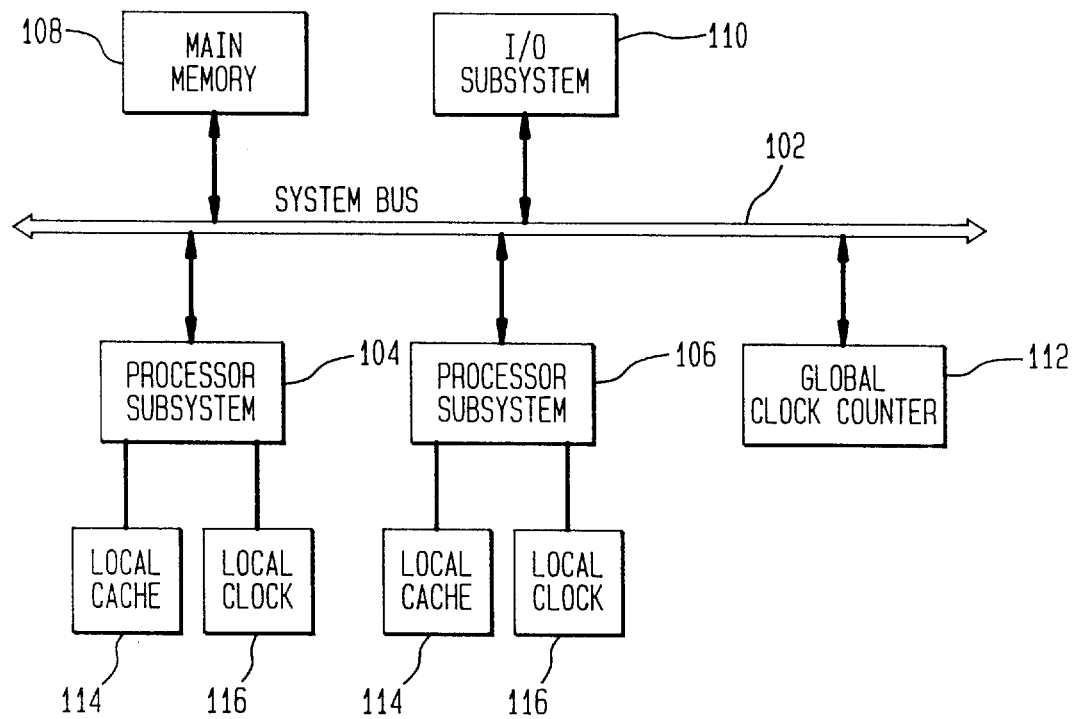
FIG. 1 is a block diagram of a conventional solution to the global clock problem outlined above.

FIG. 1 illustrates a conventional stared memory multiprocessor system 100. System 100 includes a system bus 102, a processor subsystem 104, a processor subsystem 106, a memory 108, an I/O subsystem 110 and a global clock counter 112. Each processor subsystem 104, 106 is attached to a local cache 114 and a local clock or oscillator 116.

As discussed above in the Related Art section, real-time operations such as a video simulation, require that certain events be performed by processor subsystems 104, 106 in synchrony with one another. This requires that accurate time stamps be available. Such time stamps are provided by global counter 112. If processor subsystem 104 requires a global time stamp, it win read the value of global counter 112 over system bus 102. Aside from presenting a single point of failure (global clock counter 112) and using valuable bandwidth of system bus 102 each time a time stamp is required, system 100 will provide acceptable performance for systems having a small number of processors. However, many problems will be presented when this type of system is scaled to a larger distributed system. For example, if two processor subsystems 104, 106 attempt to read global clock counter 112 at the same time, one processor subsystem will have to wait until the other processor subsystem is completed. The period which the one processor subsystem waits introduces jitter or timing unpredictability into the timing of the system. This jitter must be accounted for and doing so reduces system throughput.

With the advent of video-on-demand, virtual reality, on-line video authoring and editing and other state-of-the-art real-time computing applications, a global clock system which overcomes the limitations of such conventional systems is desired.

The preferred embodiment of the invention is now described in an environment of a distributed shared memory (DSM) multiprocessor utilizing a coherent switch-based interconnect. The DSM multiprocessor includes a plurality of nodes interconnected in, for example, a hypercube topology. Such a DSM multiprocessor is described in detail in commonly owned, copending U.S. patent application Ser. No. 08/435,456, filed on even date herewith, entitled "System and Method for Network Exploration and Access in a Multiprocessor Environment," the full text of which is incorporated herein by reference as if reproduced in full below.

Figure 2:
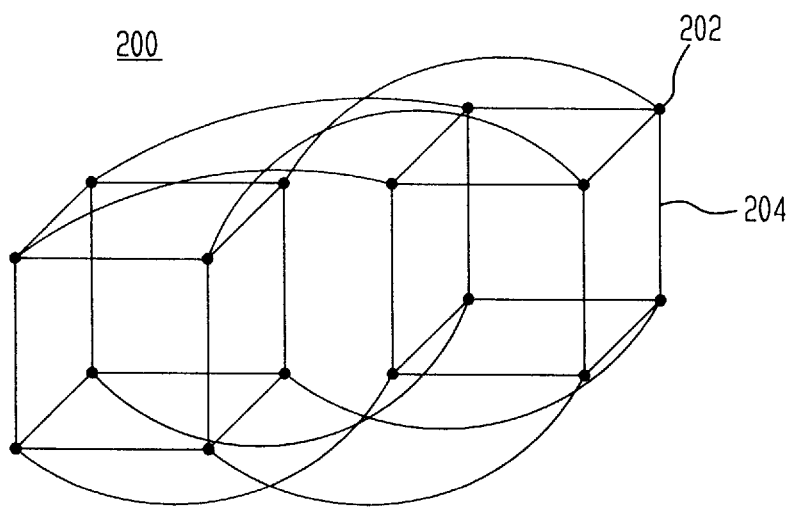
FIG. 2 illustrates a hypercube network configuration for a multiprocessor system.
Figure 3:
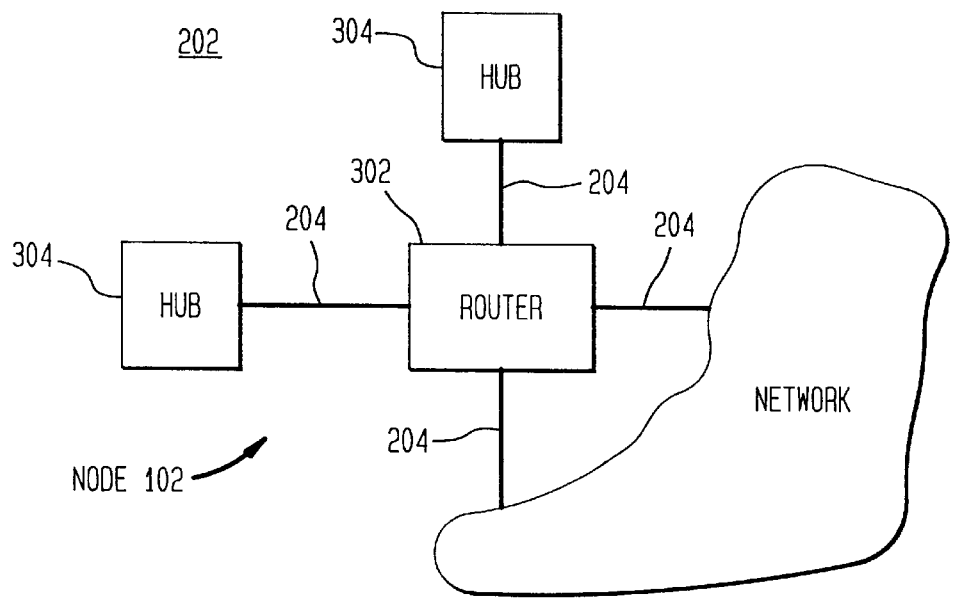
FIG. 3 is a block diagram illustrating an example node of the hypercube network of FIG. 2.

For ease of explanation, a sample hypercube topology is briefly described with reference to FIG. 2. FIG. 2 illustrates a 4-dimensional hypercube network 200. Network 200 includes a plurality of nodes 202 connected by edges or links 204. This hypercube includes, for example, sixteen nodes. As discussed in the above-reference patent application, the complexity of each node 202 can vary depending on the particular implementation of the multiprocessor system. In its simplest form, each node 202 is a microprocessor functioning as a computing engine in a multiprocessing engine in a multiprocessor system. In more complex environments, each node can support multiple processors and/or I/O functionality. For example, a relatively complex node architecture is illustrated in FIG. 3. In this architecture, each node 202 includes a router 302 and one or more hubs 304. Router 302 makes the appropriate connections between other nodes 202 of the network 200 via edges 204 in the one or more hubs 304. Each hub 304 can include one or more processors and/or I/O devices.

Figure 4:
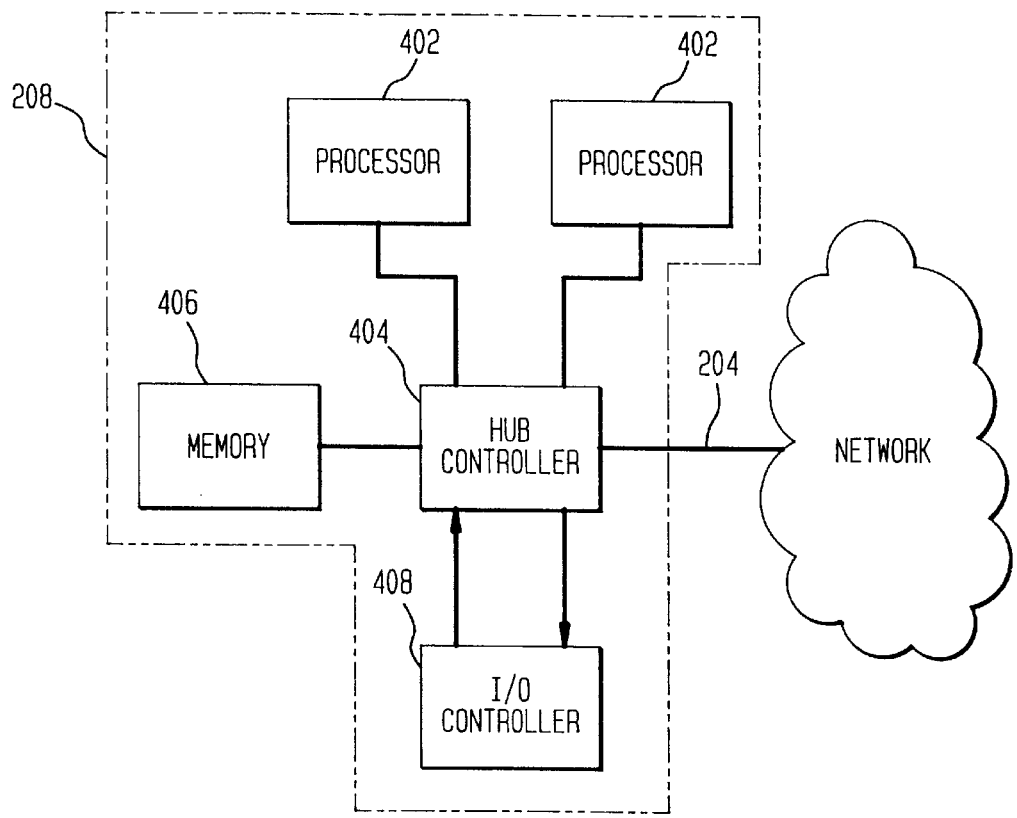
FIG. 4 is a block diagram illustrating an example hub of a node of FIG. 3.

FIG. 4 is a diagram illustrating an example architecture of a hub 304. Hub 304 includes one or more processors 402, a controller 404, memory 406, an I/O controller 408 and a link 204 to the router network. Hub controller 404 controls access to the resources of hub 304 by other hubs on the network 200. Memory 406 provides local memory to processors 402 and can be also shared among processor across network 200 and with I/O devices connected to any of nodes 102 on the network 200. I/O controller 408 provides a network interface to one or more I/O devices.

Figure 5:
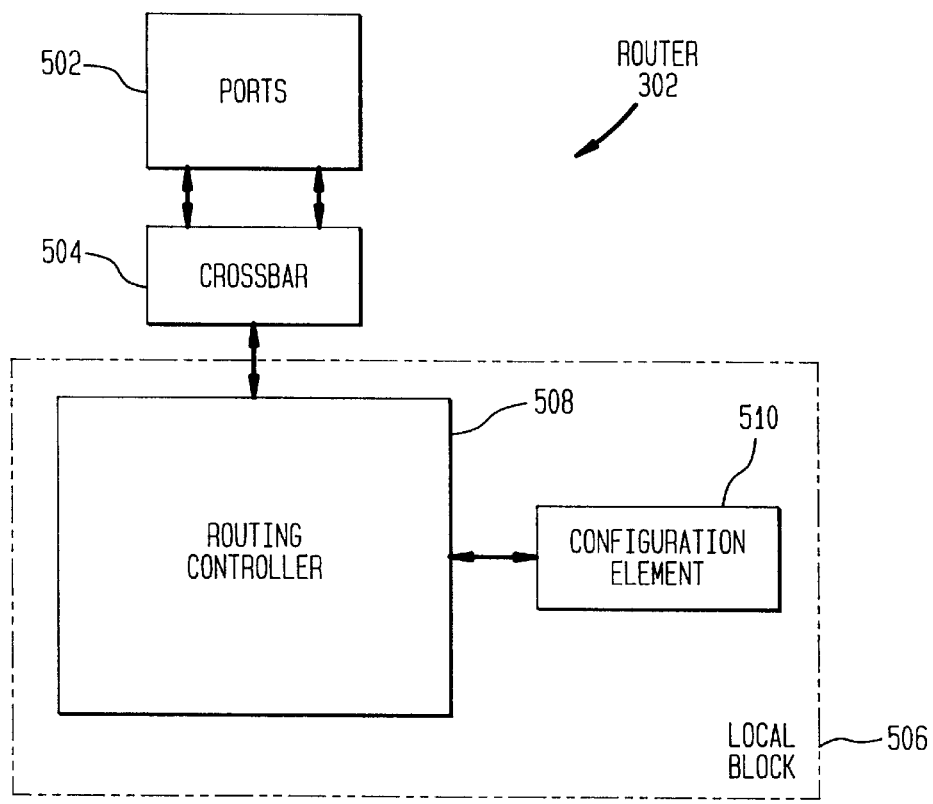
FIG. 5 is a block diagram illustrating an example router of a node of FIG. 3.

An example architecture of router 302 is illustrated in FIG. 5. Router 302 includes I/O ports 502, a crossbar 504 and a local block 506. Local block 506 includes a routing controller 508 and a configuration element 510.

Ports 502 of router 302 are configured to accept data from a first node 202 and to provide that data to a second node 202. Routing controller 508 examines routing information contained in a received data packet and/or in an internal routing table and routes that data packet out of a selected output port 502 based on the routing information. Routing Controller 508 is also able to write information to the received data packet to indicate routing information such as the input port 502 at which the packet was received.

Configuration element 510 stores configuration information regarding the configuration of the particular router 302. The configuration can include parameters as the revision number of the router, the router identifier, the quantity of ports 502 contained in the router, the status of each port (i.e., active, faults, etc.) as well as other information.

This description of FIGS. 2–5 is provided to illustrate an example environment for implementation of the distributed clock system of the invention. More details regarding this example environment can be found in the above-referenced U.S. patent application. However, a person skilled in the relevant art will recognize that the distributed global clock system of the invention has application to a plurality of many different multiprocessor systems.

Figure 6:
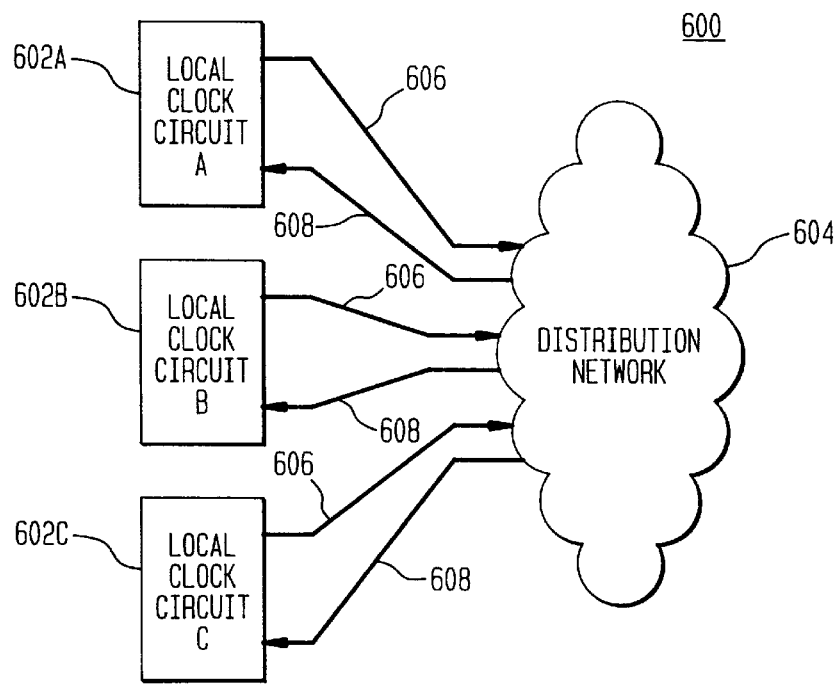
FIG. 6 illustrates a high level block diagram of the distributed clock system of the present invention.

FIG. 6 is a high level block diagram illustrating the structure and operation of a distributed global clock system 600 of the invention. System 600 includes a plurality of local clock circuits 602 and a distribution network 604. Each local clock circuit 602 is associated with a processor of the DSM multiprocessor system. The term distribution network may include, for example, the nodes 202 (i.e., at least a router of a node 202) and edges 204 used to communicate information between the processors of the multiprocessor system.

Each local clock circuit 602 generates a global clock source signal 606 which is transmitted to distribution network 604. Distribution network 604 selects a single signal from among the plurality of global clock source signals 606 received from local clock circuits 602. Distribution network 604 then transmits the selected global clock source signal 606 back to each local clock circuit 602 as a global clock signal 608. Thus, each local clock circuit 602 will receive the same global clock signal 608. However, any one of local clock circuits 602 may be the source of the global clock signal 608. Thus, no single point of failure is presented by the global clock system of the invention.

Upon receiving the global clock signal 608 from distribution network 604, each local clock circuit 602 will generate a global time value for use in performing synchronous real-time operations between a plurality of processors of the DSM multiprocessor.

Figure 7:
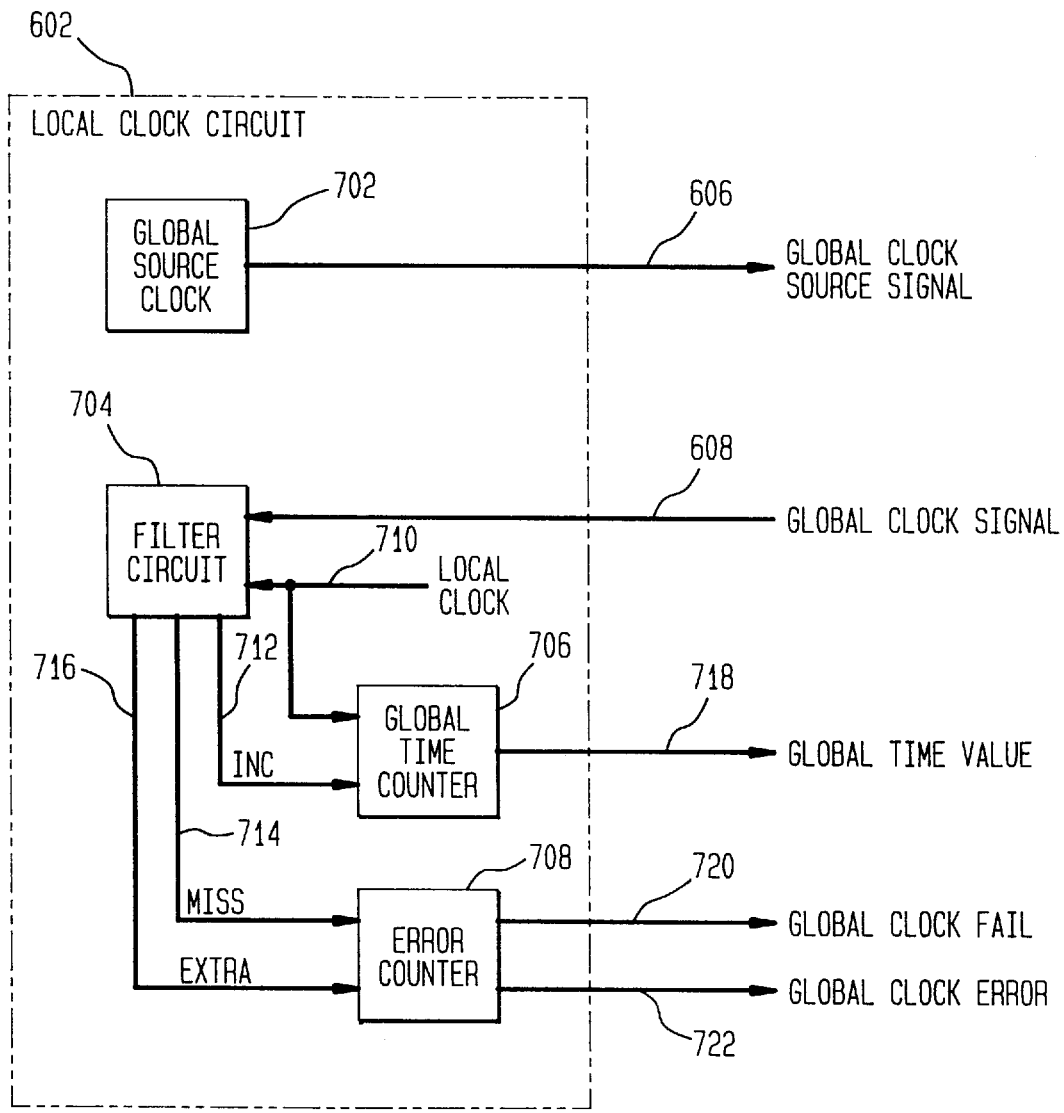
FIG. 7 is a simplified block diagram of a local clock circuit in accordance with the present invention.

A simplified block diagram of a local clock circuit 602 is illustrated in FIG. 7. Local clock circuit 602 includes a global source clock 702, a filter circuit 704, a global time counter 706 and an error counter 708. Global source clock 702 generates global clock source signal 606. Filter circuit 704 receives global clock signal 608 and a local clock signal 710. As explained in further detail below, filter circuit 704 uses local clock 710 to implement a sampling window within which an edge of global clock signal 608 is expected. When an edge of global clock signal 608 is received during the sampling window, filter circuit 704 produces an increment signal 712. Increment signal 712 is provided to global time counter 706. If the expected edge of global clock signal 608 does not occur during the sampling window, filter circuit 704 will produce increment signal 712 at the end of the sample window. When this happens, filter circuit 704 will also produced a missed edge signal 714 indicating that an error has occurred. The missed edge signal 714 is provided to error counter 708. If filter circuit 704 receives an unexpected edge of global clock signal 608, filter circuit 704 will not provide increment signal 712 to global time counter 706. Rather, filter circuit 704 will provide an extra edge signal 716 to error counter 708. An "unexpected" edge of global clock signal 608 is an edge which is received by filter circuit 704 outside of the sampling window.

Global time counter 706 receives local clock 710 and increment signal 712. Global time counter 706 will increment one count upon receipt of each increment signal 712. Global time counter 706 produces a count 718 which is the desired global time value. Global time value 718 will be the same across all of local clock circuits 602. By "the same," it is meant the equivalent value including any acceptable skew. The skew represents the maximum variation in receipt times of the global clock signal 608 across all local clock circuits 602. Variations in receipt times may occur as a result of, for example, different length transmission paths which the global clock source signal 606 and the global clock signal 608 must traverse to reach the local clock circuit of each processor.

Error counter 708 maintains a first count of missed edge signals 714 and a second count of extra edge signals 716. These counts are used by error counter 708 to generate a global clock fail signal 720 and a global clock error signal 722. For example, if an edge of global clock signal 608 is missed a predetermined number of times over a set period, then error counter 708 may generate global clock fail signal 720 to indicate to the DSM multiprocessor that the global clock has failed and that a different local clock circuit 602 should be selected to provide the global clock signal 608. Global clock error signal 722 may be used by the multiprocessor to track errors occurring in receipt of global clock signal 608 for performance or other system analyses.

In a preferred embodiment, global clock signal may have, for example, a frequency in the range of 1 MHz. Similarly, local clock 710 may have a frequency in the range of 100 MHz. As discussed below, global clock source signal 606 may be produced by dividing the frequency of local clock signal 710. However, this is not required. Any oscillator or oscillator combination may be used to produce global clock source signal 606. That is, local clock signal 710 may operate asynchronously with respect to global clock source signal 606.

Figure 8:
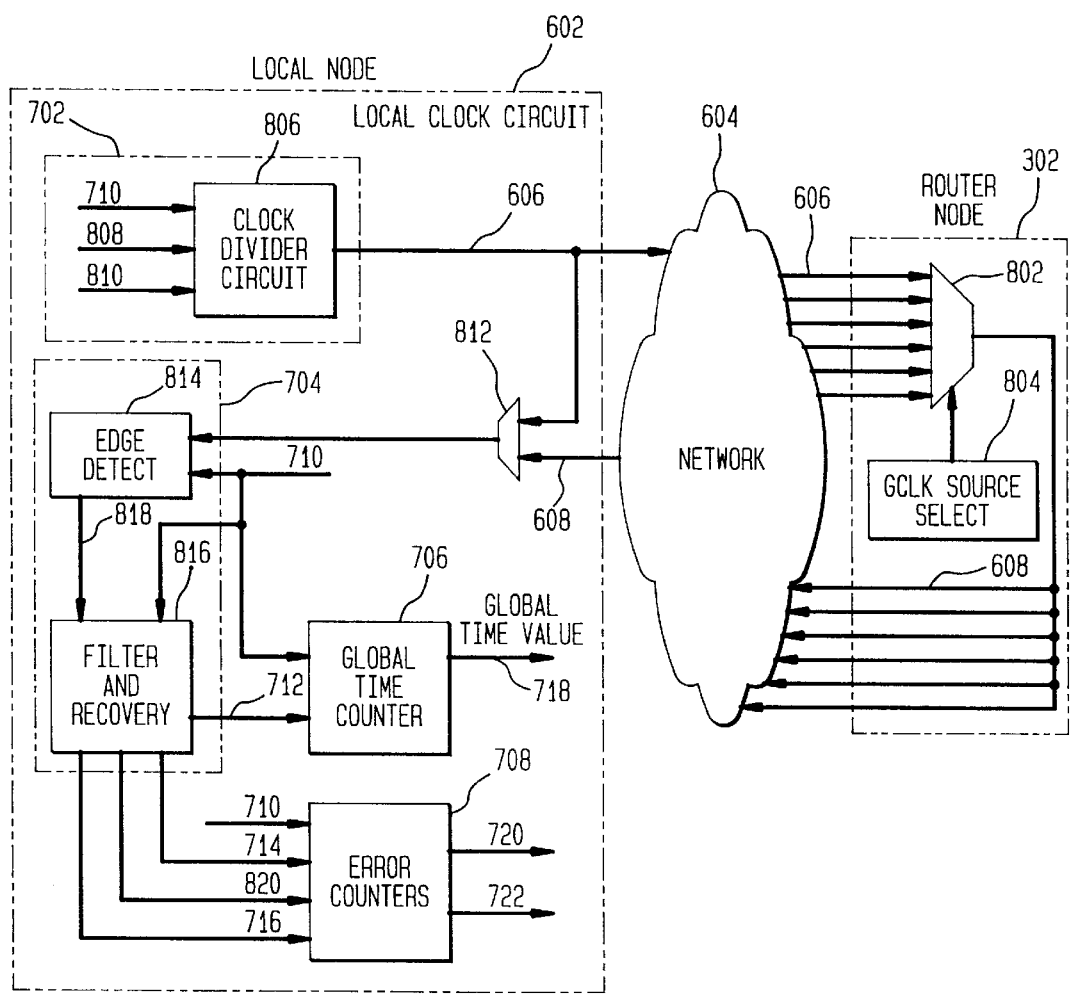
FIG. 8 is a more detailed block diagram of the distributed clock system of the present invention.

FIG. 8 illustrates a preferred embodiment of local clock circuit 602 including its interface with distribution network 604. As illustrated, each local clock circuit 602 provides a global clock source signal 606 to distribution network 604. A router node 302 is illustrated to logically represent operation of distribution network 604. That is, router node 302 receives a plurality of global clock source signals 606 and outputs a single global clock signal 608 on a plurality of lines. In this logical representation, router 302 includes a multiplexer 802 and a global clock source select circuit 804. Global clock source select circuit 804 controls which global clock source signal 606 is selected by multiplexer 802. Multiplexer 802 then selects one of the plurality of global clock source signals 606 and provides the selected signal as the global clock signal 608 to a plurality of local clock circuits 602 (only one local clock circuit is shown in FIG. 8) via distribution network 604.

In this preferred embodiment of local clock circuit 602, global source clock 702 is represented by a clock divider circuit 806 which receives local clock signal 710, a global clock enable signal 808 and a divide ratio signal 810. Clock divider signal 806 divides local clock signal 710 by a ratio indicated by divide ratio signal 810 to produce global clock source signal 606. For example, in one embodiment, local clock signal 710 is a 100 MHz signal. Divide ratio signal 810 represents a divide by one hundred ratio to clock divider circuit 806. Thus, clock divider circuit 806 produces a global clock source circuit 606 having a frequency of 1 MHz.

Global clock enable signal 808 is used to disable clock divider circuit 806 so that global clock source signal 606 is not produced (i.e., no edges occur in global clock source signal 606). As described in greater detail below, this disable feature of clock divider circuit 806 is used to initialize the global time counters 706 of all local clock circuits 602 to provide a single synchronized global time value 718 across all processors.

Global clock signal 608 is received by local clock circuit 602 into a 2:1 multiplexer 812. Multiplexer 812 provides local clock circuit 602 the option of selecting either global clock signal 608 or global clock source signal 812. During multiprocessor operations, it is preferred that local clock circuit 602 always operate from global clock signal 608. The option of selecting global clock source signal 606 is provided only to allow local clock circuit 602 autonomous operation. For example, if it is desired to operate a processor in a single processor environment, then a global time value 718 synchronized across a plurality of processors is not required and global clock source signal 606 may be used directly as global clock signal 608.

During operation in a multiprocessor environment, however, global clock signal 608 is preferably always received from distribution network 604 even for the local clock circuit 602 whose global clock source signal 606 has been selected as global clock signal 608. This assures that all of local clock circuits 602 are receiving the global clock signal 608 through the same distribution network with the only variations being in the lengths of the actual transmission paths which the global clock source signal 606 has taken to reach the local clock circuits 602. This variation can be represented by a small amount of skew in global time value 718.

Filter circuit 704 is implemented by an edge detection circuit 814 and a filter and recovery circuit 816. Edge detection circuit 814 uses local clock 710 to check for the presence of an edge of global clock signal 608. Upon detection of an edge, edge detection circuit 814 provides an edge detection signal 818 to filter and recovery circuit 816. Filter and recovery circuit 816 implements the sampling window of filter circuit 704. This function is described in greater detail below with reference to FIG. 9.

Filter and recovery circuit 816 produces increment signal 712, missed edge signal 714 and extra edge signal 716. In addition, filter and recovery circuit 816 produces an edge seen signal 820. Edge seen signal 820 is used by error counter circuit 708 to reset the missed edge and extra edge counters 708. By doing so, spurious errors need not be accumulated for the purposes of determining whether global clock fail signal 720 should be generated. For example, only if a predetermined number of missed edges have occurred without the intervening occurrence of an edge, will the global clock fail signal 720 be generated.

Figure 9:
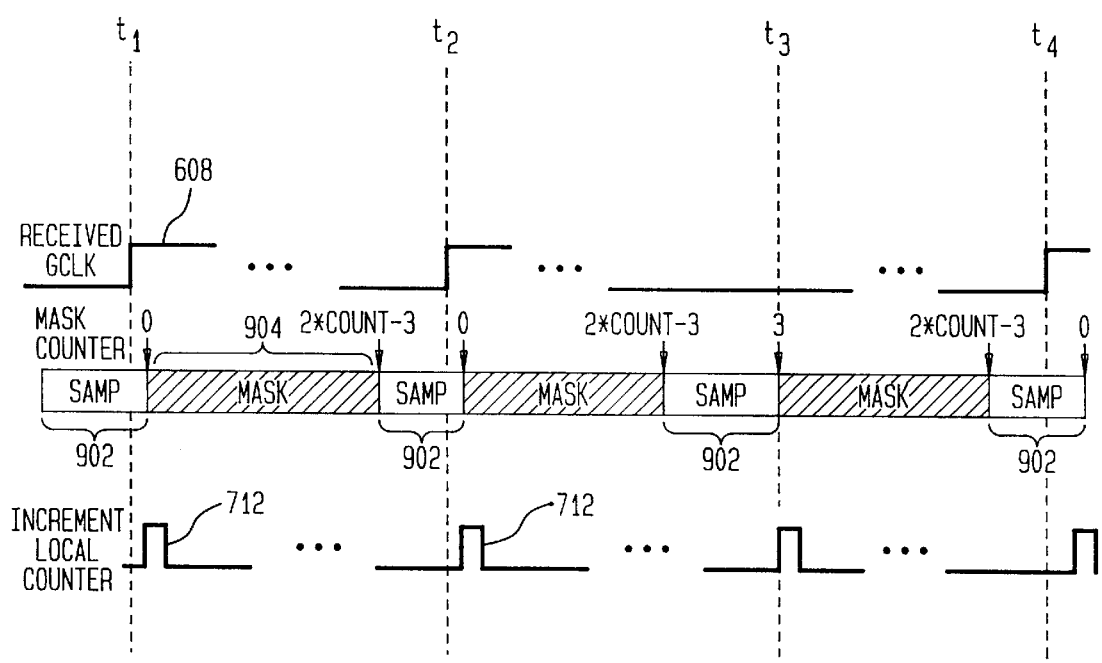
FIG. 9 is a timing diagram illustrating operation of a filter circuit of the present invention.

FIG. 9 is a timing diagram illustrating operation of filter and recovery circuit 816 in generating the sampling window. The periodic sampling window is illustrated by reference number 902. The global clock signal 608 and the increment signal 712 are also illustrated. Note that sampling window 902 is produced by filter and recover circuit 816 generating a mask signal 904. The length or period of mask signal 904 is used to position sampling window 902.

When an edge of the global clock signal 608 is received by filter and recovery circuit 816 at times $t_1$ and $t_2$, filter and recovery circuit 816 produces increment signals 712. The difference between times $t_1$ and $t_2$ represents the period of the global clock signal 608. Note also that the sampling window has a frequency approximately equal to the frequency of global clock signal 608. Receipt of an edge of global clock signal 608 is expected in the center (indicated by COUNT=0) of a sampling window having a length of six counts (i.e., COUNT−3 to COUNT+3). The sampling window is closed upon receipt of the edge of global clock signal 608. Thus, the sampling window is opened at COUNT−3 and is closed at approximately COUNT.

At time $t_3$, the sampling window 902 expired without receipt of an edge of global clock signal 608 (i.e., COUNT+3 was reached). Accordingly, filter and recovery circuit 816 generates increment signal 712 at the expiration of sampling window 902. Note then that the next mask period commences not at COUNT=0, but at COUNT=3. This compensates for the fact that the previous sampling window was held open three counts longer than normal awaiting receipt of an edge. Thus, the next sampling window will be centered for receipt of an edge at COUNT. At time $t_4$, an edge of global clock signal 608 is then received within the properly aligned sampling window 902, resulting in production of increment signal 712.

As mentioned above, global clock enable signal 808 is used to disable the selected global clock source signal 606 during initialization of the global time counters 706 of all local clock circuits 602 to provide a single synchronized global time value 718 across all processors. In the preferred embodiment, initialization is performed in accordance with the flowchart of FIG. 10.

Figure 10:
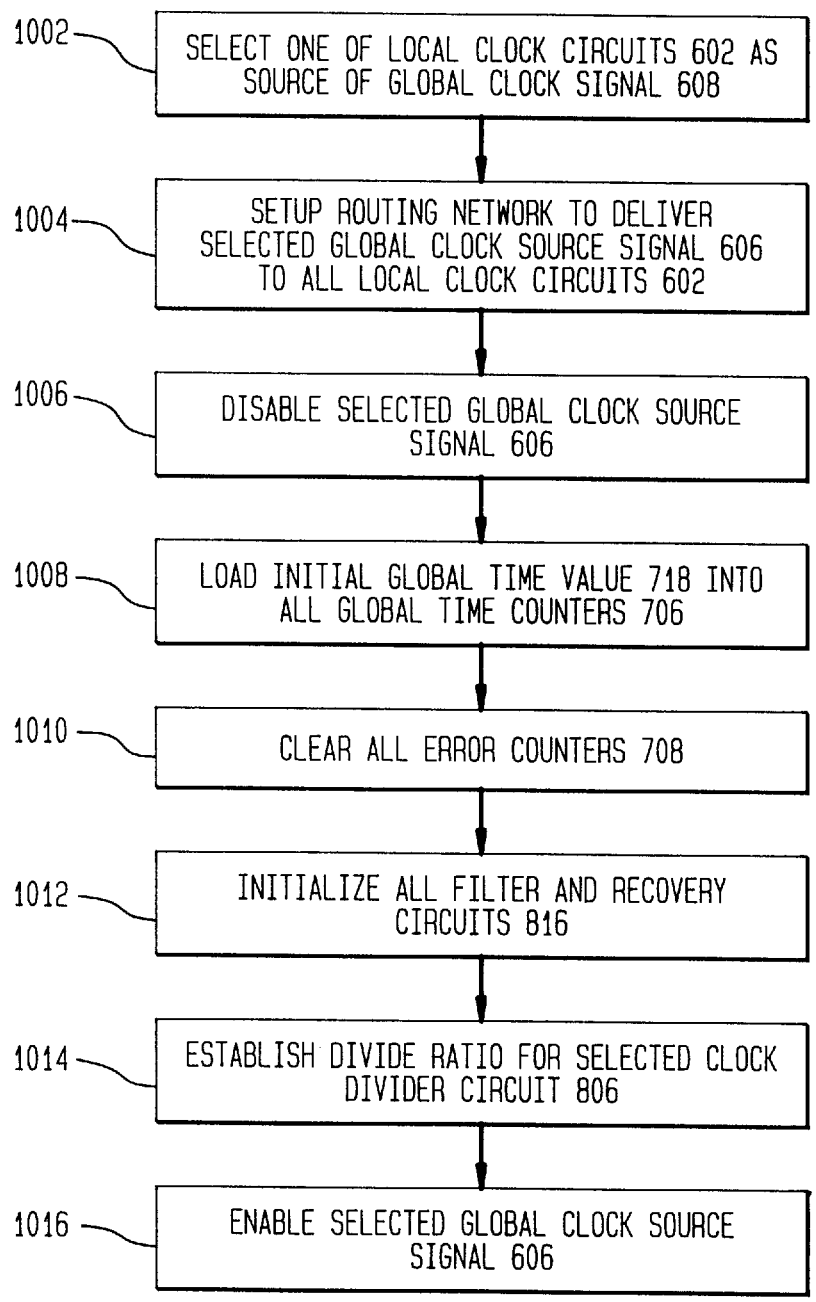
FIG. 10 is a flow chart illustrating a method of initializing the global clock system of the invention.

Referring to FIG. 10, initialization of the clock system of the invention is described. In a step 1002, a local clock circuit 602 is selected as the global clock source. The routing network is then set up, in a step 1004, to route the global clock source signal 606 of the selected local clock circuit to all of the local clock circuits 602. In a step 1006, the global clock source signal 606 of the selected local clock circuit 602 is disabled. This is accomplished by a selected processor which deasserts the enable (or asserts the disable) signal 808 on the clock divider circuit 806 of the selected local clock circuit 602. This prevents edges from being produced in the global clock signal 608 that is distributed to all local clock circuits 602.

In a step 1008, an initial global time value 718 is loaded into the global time counter 706 of each local clock circuit 602. In a step 1010, error counters 708 are cleared in each local clock circuit 602. In a step 1012, the filter and recovery circuit 806 of each local clock circuit 602 is initialized. Initialization of filter and recovery circuit 806 involves setting the value of COUNT (which determines the length of the sampling window) and disabling masking and missed edge generation until receipt of a first edge of the global clock signal 608. This feature is described in more detail below.

Each of steps 1006, 1008, 1010 and 1012 may be performed by the selected processor or by each local processor of a node under the direction of the selected processor. Upon completion of these steps, which initialize each local clock circuit, the method proceeds to step 1014.

In step 1014, the selected processor establishes a divide ratio for the clock divider circuit 806 of the selected local clock circuit 602. Finally, in step 1016, the selected processor enables the global clock source signal 606 by asserting the enable (or deasserting the disable) signal 808 on clock divider circuit 806. All global time counters 706 will then begin counting global time value 718 in synchrony.

As stated above, in step 1012, the filter and recovery circuits 816 are initialized to set the value of COUNT and to disable masking and edge generation until receipt of a first edge of the global clock signal 608. It is possible for the local clock circuits 602 to generate increment signals 712 upon expiration of a sampling window even though no global clock signal 608 is being sent. The local clock circuits, however, are not yet synchronized. Thus, the increment signals will be generated asynchronously from one local clock circuit 602 to another. To prevent this from occurring, missed edge generation is disabled in filter and recovery circuit 706. Also, masking is disabled so that when the first actual global clock edge is received, it will not be masked out. Thus, when the first edge of the global clock signal arrives, it will simultaneously start each counter 706 counting. Once the first edge is received, masking and missed edge generation are again enabled.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A clock system for a distributed multiprocessor system having a plurality of processing nodes interconnected by a distribution network, the clock system comprising:
   (a) a plurality of local clock means for generating a global clock source signal, for receiving a global clock signal from the distribution network, and for generating a global time value based on a local clock signal and said global clock signal, said global time value being used for synchronous operation between the plurality of processing nodes, each local clock means being associated with one of the plurality of processing nodes; and
   (b) router means, in said distribution network, for receiving each of said global clock source signals from said plurality of local clock means, for selecting one of said global clock source signals as said global clock signal, and for providing said global clock signal to said distribution network.

2. The clock system of claim 1, wherein each of said plurality of local clock means comprises:
   i) a global source clock means for generating said global clock source signal;
   ii) output means for providing said global clock source signal to the distribution network of the distributed multiprocessor system;
   iii) input means for receiving said global clock signal from the distribution network;
   iv) filter means for producing a counter increment signal based on said local clock signal and said global clock signal; and
   v) counter means for generating said global time value in response to said counter increment signal.

3. The clock system of claim 2, wherein said filter means comprises:

mask means for generating a periodic sampling window having a frequency approximately equal to a frequency of said global clock signal and having a length corresponding to a portion of a period of said global clock signal; and
   increment means for producing said counter increment signal in response to receipt of an edge of said global clock signal during said sampling window, and for producing said counter increment signal at expiration of said sampling window if an edge of said global clock signal is not received during said sampling window.

4. The clock system of claim 3, wherein said increment means, further comprises:
   means for causing said mask means to terminate said sampling window upon production of said counter increment signal; and
   means for causing said mask means to schedule a subsequent sampling window upon production of said counter increment signal, including adjusting the scheduling based upon whether said counter increment signal was produced as a result of said global clock signal or expiration of a previous sampling window.

5. The clock system of claim 4, wherein said increment means, further comprises means for generating a missed edge signal each time an edge of said global clock signal is not received during said sampling window; and
   wherein each of said plurality of local clock means further comprises means for counting said missed edge signals and for generating a first clock error signal when said count exceeds a first threshold.

6. The clock system of claim 5, wherein said increment means, further comprises means for generating an extra edge signal each time an edge of said global clock signal is received outside of said sampling window; and
   wherein each of said plurality of local clock means further comprises means for counting said extra edge signals and for generating a second clock error signal when said count exceeds a second threshold.

7. The clock system of claim 1, wherein said router means comprises:
   multiplexer means for receiving said local clock signal from said plurality of global source clock means; and
   control means for causing said multiplexer means to output one of said local clock signals as said global clock signal.

8. The clock system of claim 1, wherein each of said local clock means further comprises:
   initialization means for initializing said global time value.

9. The clock system of claim 3, wherein each of said local clock means further comprises:
   initialization means for initializing said global time value.

10. The clock system of claim 9, wherein said initialization means comprises:
   first means for disabling said global clock source signal and to allow initialization of said global time value and for enabling said global clock source signal to complete said initialization;
   second means for setting said counter means to an initial value;
   third means for disabling said mask means so that said increment means is permitted to produce said counter increment signal in response to receipt of an edge of said global clock signal without filtering by said sampling window and for preventing said increment means from producing said counter increment signal at expiration of said sampling window; and fourth means for disabling said third means after receipt by said filter means of a first edge of said global clock signal.

11. A clock apparatus for use with a processor of a multiprocessor system, comprising:

means for generating a global clock source signal and providing said global clock source signal to a distribution network, wherein said distribution network uses said global clock source signal to produce a global clock signal;

means for receiving said global clock signal from said distribution network; and means for generating a global time value based on a local clock signal and said global clock signal, said means for generating including
filter means for producing a counter increment signal based on said local clock signal and said global clock signal, and
counter means, responsive to said counter increment signal, for generating said global time value.

12. The clock apparatus of claim 11, wherein said filter means comprises:

mask means for generating a periodic sampling window having a frequency approximately equal to a frequency of said global clock signal and having a length corresponding to a portion of a period of said global clock signal; and increment means for producing said counter increment signal in response to receipt of an edge of said global clock signal during said sampling window, and for producing said counter increment signal at expiration of said sampling window if an edge of said global clock signal is not received during said sampling window.

13. The clock apparatus of claim 12, wherein said increment means, further comprises:

means for causing said mask means to terminate said sampling window upon production of said counter increment signal; and means for causing said mask means to schedule a subsequent sampling window upon production of said counter increment signal, including adjusting the scheduling based upon whether said counter increment signal was produced as a result of said global clock signal or expiration of a previous sampling window.

14. The clock apparatus of claim 13, wherein said increment means, further comprises means for generating a missed edge signal each time an edge of said global clock signal is not received during said sampling window; and wherein the clock apparatus further comprises means for counting said missed edge signals and for generating a first clock error signal when said count exceeds a first threshold.

15. The clock apparatus of claim 13, wherein said increment means, further comprises means for generating an extra edge signal each time an edge of said global clock signal is received outside of said sampling window; and wherein the clock apparatus further comprises means for counting said extra edge signals and for generating a second clock error signal when said count exceeds a second threshold.

16. The clock apparatus of claim 12, further comprising:

initialization means for initializing said global time value.

17. The clock apparatus of claim 16, wherein said initialization means comprises:

first means for disabling said global clock source signal and to allow initialization of said global time value and for enabling said global clock source signal to complete said initialization;

second means for setting said counter means to an initial value;

third means for disabling said mask means so that said increment means is permitted to produce said counter increment signal in response to receipt of an edge of said global clock signal without filtering by said sampling window and for preventing said increment means from producing said counter increment signal at expiration of said sampling window; and fourth means for disabling said third means after receipt by said filter means of a first edge of said global clock signal.

* * * * *